Patented July 1, 1947

2,423,139

UNITED STATES PATENT OFFICE 2,423,139

CHLORINATED FURANE RESIN

John Delmonte, Glendale, Calif., assignor of one-tenth to E. F. Lougee, and sixty-five one-hundredths to Ralph Hemphill, both of Los Angeles, Calif.

No Drawing. Application August 31, 1944, Serial No. 552,213

4 Claims. (Cl. 260—67)

This invention relates to resins made by chlorination of furfural-containing materials.

One object of the invention is to provide a solid furane resin which is capable of further polymerization to an infusible, insoluble solid. Another object is to provide chlorinated furane resins. Another object is to provide furane type resins of light color. Still another object is to provide methods for polymerization and chlorination of furfural-containing materials.

These and other objects are attained by my invention which will be fully described and illustrated by examples. I have discovered that solid, fusible, thermosetting resins may be made by passing chlorine gas into furfural, or furfuryl alcohol, or mixtures of furfural and furfuryl alcohol. This may take place with or without the presence of caustic alkali, and the reaction may be stopped at a point corresponding to the B stage of polymerization. The B stage resins thus prepared are solids instead of liquids, the latter being the usual form of the furane B-stage resins. According to my discovery, the chlorine is an effective catalyst for the resinification of furfural, or furfuryl alcohol, or mixtures of these two ingredients, and the chlorine also enters the furane ring structure so that the resins are polymerized molecules, or condensed compounds, including chlorinated furane rings; the hydrochloric acid which is simultaneously formed in the chlorination reaction serving also as a catalyst. The final C stage resins, infusible and insoluble, are made from the B stage resins by heating alone, or by heating in the presence of acid catalysts.

*Example I.*—As an example of the preparation of my chlorinated furane resin in the presence of caustic soda, I mix together

|  | Parts by weight |
|---|---|
| Furfural | 35 |
| Furfuryl alcohol | 70 |
| A 25 per cent aqueous caustic soda solution | 100 |

Into this mixture I passed chlorine gas. An exothermic reaction started immediately, as the gas was taken up by the liquid. The mixture warmed up from room temperature, and some cooling was required to keep the reaction from getting out of control. The liquid gradually thickened, and near the end point, in about 30 minutes, it began to froth freely, which indication I have discovered may be used as an endpoint for the addition of chlorine in order to stop the polymerization at the B stage. The further reaction was stopped at this point by adding an equal volume of cold water. The solid resin in porous form was suspended in the aqueous liquid from which it was collected, and then washed. The B stage resin may be molded or otherwise formed, or it may be dissolved in solvents such as acetone, and finally brought to the C stage of resinification by heating. If in producing the resin in stage B, the reaction is allowed to go beyond the above described frothing stage, the solid lump of material which eventually forms is more difficult to wash free from soluble materials, and is more difficult to handle in forming or dissolving, and it may go over completely to the final C stage. The amount of chlorine dissolved or reacted varies with the proportions of the ingredients in the starting liquid. In the above illustrative example, the amount of chlorine absorbed was somewhat less than one mole of chlorine for each furane ring. While in this example the ratio of the furfural to furfuryl alcohol is 1:2, chlorinated furane type resins may be made with substantially all proportions from pure furfural to pure furfuryl alcohol.

*Example II.*—As another example of my invention, I mixed

|  | Parts by weight |
|---|---|
| Furfural | 100 |
| 25 percent aqueous caustic soda solution | 100 | and then passed chlorine gas into this mixture for about 15 minutes. A heavy resinous precipitate forms accompanied by considerable heating of the solution, and toward the end much frothing. When the mixture begins to froth excessively, it may be quenched by adding cold water. The resin was washed free of alkali, and could be formed, or dissolved in solvents such as acetone, and then finally set to the C stage by heating, or heating in the presence of small amounts of strong acids as catalysts.

*Example III.*—As a modification of the above Example II, I have used solid caustic, preferably flake caustic, and get somewhat similar results:

|  | Parts by weight |
|---|---|
| Furfural | 100 |
| Flaked caustic soda | 50 |

Chlorine was passed into the mixture, and in several minutes a heavy resinous precipitate formed, which can be separated and washed, and appears to have similar properties to those described under Example II.

Strong alkalies such as sodium and potassium hydroxides, sodium peroxide, and ammonium hydroxide have been used in this process, and the amounts do not appear to be critical except that strong alkalinity is maintained during chlorination, through the endpoint where precipitation and frothing occur.

When furfural is the starting liquid, it is probable that the caustic soda produces some furfuryl alcohol by the Canizzaro reaction, and in consequence, actually mixtures of furfural and furfuryl alcohol are involved in the chlorination even though the starting material is the aldehyde.

*Example IV.*—The chlorinated furfural resins may be formed without the presence of the caustic soda. In one case chlorine was passed for about an hour into furfural alone. The gas was absorbed, and the liquid gradually thickened, and became heated, and after two hours set to an infusible, insoluble gel.

The addition of chlorine, and the formation of resins of chlorinated furane materials may also be accomplished in inert chlorinated solvents such as chloroform, carbon tetrachloride, and trichlorethylene, in which case a stage B chlorinated furane resin in solution is formed, and this solution may be used directly for impregnating porous materials, or for coating surfaces or filler materials. The use of such solvents has the effect of giving a slower and smoother reaction, and therefore a more uniform polymerization. It also permits the use of lower temperatures for the chlorination.

*Example V.*—Illustrating the use of solvents, 50 parts by weight of furfural was dissolved in 50 parts by weight of carbon tetrachloride, and chlorine gas slowly passed into the solution. Nine parts by weight of chlorine was absorbed in the first hour, and 7 parts in the second hour. The temperature was maintained at room temperature. Films of resin were formed by spreading the solution over a metal surface, and allowing the solvent to evaporate.

Furfuryl alcohol alone also forms resinous compounds when treated with chlorine. Without the presence of caustic alkali, the polymerization reaction is difficult to control, because it is vigorous and exothermic, and the resin which forms is usually infusible and insoluble. For example:

*Example VI.*—Chlorine gas was passed into furfuryl alcohol at room temperature. In one or two minutes a vigorous reaction took place, and the furfuryl alcohol boiled and converted over to an infusible, insoluble polymer.

*Example VII.*—In the presence of caustic solution, the chlorination of furfuryl alcohol may be carried out under control:

Parts by weight
Furfuryl alcohol_____ 100
A 25 percent aqueous caustic soda solution__ 100

Chlorine gas was passed into this mixture, starting from room temperature. In thirty minutes vigorous frothing began, and the temperature was nearly to the boiling point. The mixture upon cooling by quenching with cold water yielded a soft resinous material.

In all cases it is believed that chlorine enters into combination with the furane ring structure, since there is a marked change in odor even after washing the resins to remove all excess chlorine. The furane resins containing chlorine, as here described, have properties different from non-chlorinated furane resins, one such outstanding difference being that a heat-convertible fusible, solid polymer is formed, whereas the usual furane polymers at the B stage are in the form of heat convertible liquids, or infusible gels. The chlorinated furane resins may be used for molding and laminating, and for other purposes.

The chlorinated furane resins of my invention, after thorough washing with water, are much lighter in color than the usual furane type resins which are characteristically very dark, or black. The chlorinated resins may be colored by the addition of dyes or other coloring materials. The lighter resins tend to darken somewhat upon heating and molding, but are still lighter in color than non-chlorinated furane resins.

This application is a continuation in part of my copending application Serial No. 500,289 filed August 27, 1943.

While I have described my invention and given illustrative examples, I do not wish to be restricted to these particular examples of mixtures or methods, but limit my invention only insofar as required by the state of the art and the spirit of the appended claims.

I claim:

1. In the process of making chlorinated furane resins, the step of adding chlorine to a furfural-containing liquid in the presence of caustic alkali.

2. In the process of making chlorinated furane resins, the step of adding chlorine to a furfural-containing liquid in the presence of aqueous caustic alkali.

3. In the process of making chlorinated furane resins, the step of adding chlorine to a mixture of furfural and furfuryl alcohol in the presence of an aqueous caustic alkali solution.

4. In the process of making chlorinated furane resins, the steps of adding chlorine to a furfural-containing liquid in the presence of an aqueous alkali solution, and stopping the reaction when the mixture froths freely.

JOHN DELMONTE.

REFERENCES CITED

The following references are of record in the file of this patent:

UNITED STATES PATENTS

| Number | Name | Date |
|---|---|---|
| 1,682,934 | Richardson | Sept. 4, 1928 |
| 2,345,966 | Fiedler | Apr. 4, 1944 |

OTHER REFERENCES

Chute Journ. Organic Chem., vol. 6, pp. 157–168 Jan. 1941 260–345.

Berichte der Deutschen Chemische Gesellschaft, vol. 32, pp. 2084–7 (1899). Copy in Scientific Library.

Recueil Des Travaux Chimiques des Pays-Bas, vol. 50, pp. 833–6 (1931). Copy in Scientific Library.